United States Patent
Yin

(10) Patent No.: US 12,513,387 B2
(45) Date of Patent: Dec. 30, 2025

(54) SHOOTING METHOD AND APPARATUS

(71) Applicant: VIVO MOBILE COMMUNICATION CO., LTD., Guangdong (CN)

(72) Inventor: Shifan Yin, Zhejiang (CN)

(73) Assignee: VIVO MOBILE COMMUNICATION CO., LTD, Guangdong (CN)

( * ) Notice: Subject to any disclaimer, the term of this patent is extended or adjusted under 35 U.S.C. 154(b) by 155 days.

(21) Appl. No.: 18/511,024

(22) Filed: Nov. 16, 2023

(65) Prior Publication Data

US 2024/0089583 A1 Mar. 14, 2024

Related U.S. Application Data

(63) Continuation of application No. PCT/CN2022/100165, filed on Jun. 21, 2022.

(30) Foreign Application Priority Data

Jun. 25, 2021 (CN) .......................... 202110711004.0

(51) Int. Cl.
*H04N 23/63* (2023.01)
*H04N 23/53* (2023.01)
*H04N 23/71* (2023.01)
*H04N 23/74* (2023.01)

(52) U.S. Cl.
CPC ............. *H04N 23/63* (2023.01); *H04N 23/53* (2023.01); *H04N 23/71* (2023.01); *H04N 23/74* (2023.01)

(58) Field of Classification Search
CPC ........ H04N 23/63; H04N 23/53; H04N 23/71; H04N 23/74
See application file for complete search history.

(56) References Cited

U.S. PATENT DOCUMENTS

| 9,330,606 | B2* | 5/2016 | Barnhoefer | .......... G09G 3/3406 |
| 9,712,749 | B2* | 7/2017 | Lombardi | ............... G06F 3/147 |
| 12,200,350 | B2* | 1/2025 | Ku | ........................ G06F 3/0481 |
| 2011/0115833 | A1 | 5/2011 | Shimoyama | |
| 2012/0280924 | A1 | 11/2012 | Kummer et al. | |
| 2015/0229844 | A1 | 8/2015 | Yamazaki et al. | |

(Continued)

FOREIGN PATENT DOCUMENTS

| CN | 104184956 A | 12/2014 |
| CN | 108810422 A | 11/2018 |

(Continued)

*Primary Examiner* — Ahmed A Berhan
(74) *Attorney, Agent, or Firm* — Price Heneveld LLP

(57) ABSTRACT

This application belongs to the field of communication technologies, and discloses a shooting method and apparatus. The method includes: displaying a shooting interface; determining an extension amplitude value of a screen based on a proportion of a shot object in the shooting interface; extending a display region of the screen based on the extension amplitude value; and determining a target brightness value of the screen based on at least one of a brightness parameter of a current shooting environment and the extension amplitude value of the screen, and adjusting a brightness of the screen based on the target brightness value. The screen is a rollable display with an extensible display region. The extension amplitude value of the screen is negatively correlated with the proportion of the shot object in the shooting interface.

15 Claims, 4 Drawing Sheets

(56) References Cited

U.S. PATENT DOCUMENTS

2019/0371270 A1   12/2019  Luo et al.
2021/0110792 A1    4/2021  Hong
2021/0150953 A1    5/2021  Lee et al.

FOREIGN PATENT DOCUMENTS

| CN | 109379539  | A  |  2/2019 |
|----|------------|----|---------|
| CN | 109976657  | A  |  7/2019 |
| CN | 111901519  | A  | 11/2020 |
| CN | 113473008  | A  | 10/2021 |
| JP | 2011109483 | A  |  6/2011 |
| JP | 2014519244 | A  |  8/2014 |
| JP | 2014229978 | A  | 12/2014 |
| JP | 2015166856 | A  |  9/2015 |
| JP | 2020160201 | A  | 10/2020 |
| WO | 2017215262 | A1 | 12/2017 |

* cited by examiner

SHOOTING METHOD AND APPARATUS

CROSS-REFERENCE TO RELATED APPLICATIONS

The present application is a continuation application of International Application No. PCT/CN2022/100165 filed on Jun. 21, 2022, which claims priority of Chinese Patent Application No. 202110711004.0, filed with the China National Intellectual Property Administration on Friday, Jun. 25, 2021, and entitled "SHOOTING METHOD AND APPARATUS", both of which are incorporated herein by reference in their entireties.

TECHNICAL FIELD

Embodiments of this application relate to the field of communication technologies, and in particular to a shooting method and apparatus.

BACKGROUND

With the development of electronic device technologies, a user takes a selfie more frequently by using an electronic device. To obtain a better shooting effect, light fill-in may be performed by using a screen in a low-brightness environment.

In related technologies, light fill-in may be performed on a shot object by increasing a screen brightness. However, such light fill-in manner affects a brightness of a shot and previewed image. This leads to a difference between an image obtained by shooting and an image previewed by the user, resulting in a poor shooting effect.

SUMMARY

Embodiments of this application are intended to provide a shooting method and apparatus, to resolve a problem of a poor imaging effect in a low-brightness shooting environment.

According to a first aspect, an embodiment of this application provides a shooting method. The method includes: displaying a shooting interface; determining an extension amplitude value of a screen based on a proportion of a shot object in the shooting interface, and extending a display region of the screen based on the extension amplitude value; and determining a target brightness value of the screen based on at least one of a brightness parameter of a current shooting environment and the extension amplitude value of the screen, and adjusting a brightness of the screen based on the target brightness value. The screen is a rollable display with an extensible display region; and the extension amplitude value of the screen is negatively correlated with the proportion of the shot object in the shooting interface.

According to a second aspect, an embodiment of this application provides a shooting apparatus. The apparatus includes: a display module, a determining module, and an adjustment module, where the display module is configured to display a shooting interface; the determining module is configured to determine an extension amplitude value of a screen based on a proportion of a shot object in the shooting interface displayed by the display module; the adjustment module is configured to extend a display region of the screen based on the extension amplitude value determined by the determining module; the determining module is further configured to determine a target brightness value of the screen based on at least one of a brightness parameter of a current shooting environment and the extension amplitude value of the screen; and the adjustment module is further configured to adjust a brightness of the screen based on the target brightness value determined by the determining module. The screen is a rollable display with an extensible display region; and the extension amplitude value of the screen is negatively correlated with the proportion of the shot object in the shooting interface.

According to a third aspect, an embodiment of this application provides an electronic device, including a processor, a memory, and a program or instructions stored in the memory and runnable on the processor. When the program or instructions are executed by the processor, the steps of the shooting method according to the first aspect are implemented.

According to a fourth aspect, an embodiment of this application provides a readable storage medium. The readable storage medium stores a program or instructions, and when the program or the instructions are executed by a processor, the steps of the method according to the first aspect are implemented.

According to a fifth aspect, an embodiment of this application provides a chip. The chip includes a processor and a communication interface. The communication interface is coupled to the processor, and the processor is configured to run a program or instructions to implement the method according to the first aspect.

In the embodiments of this application, in a case that a luminous intensity of a current shooting environment is low, based on extension of a rollable display, the extension amplitude value of the screen may be determined based on the proportion of the shot object in the shooting interface, and the display region of the screen is extended based on the extension amplitude value. Then the target brightness value of an extended screen is determined based on the brightness parameter of the current shooting environment, and the brightness of the screen is adjusted based on the target brightness value, to improve a shooting effect under a low illumination condition.

DESCRIPTION OF EMBODIMENTS

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

Terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "I" generally represents an "or" relationship between associated objects.

Figure 1:
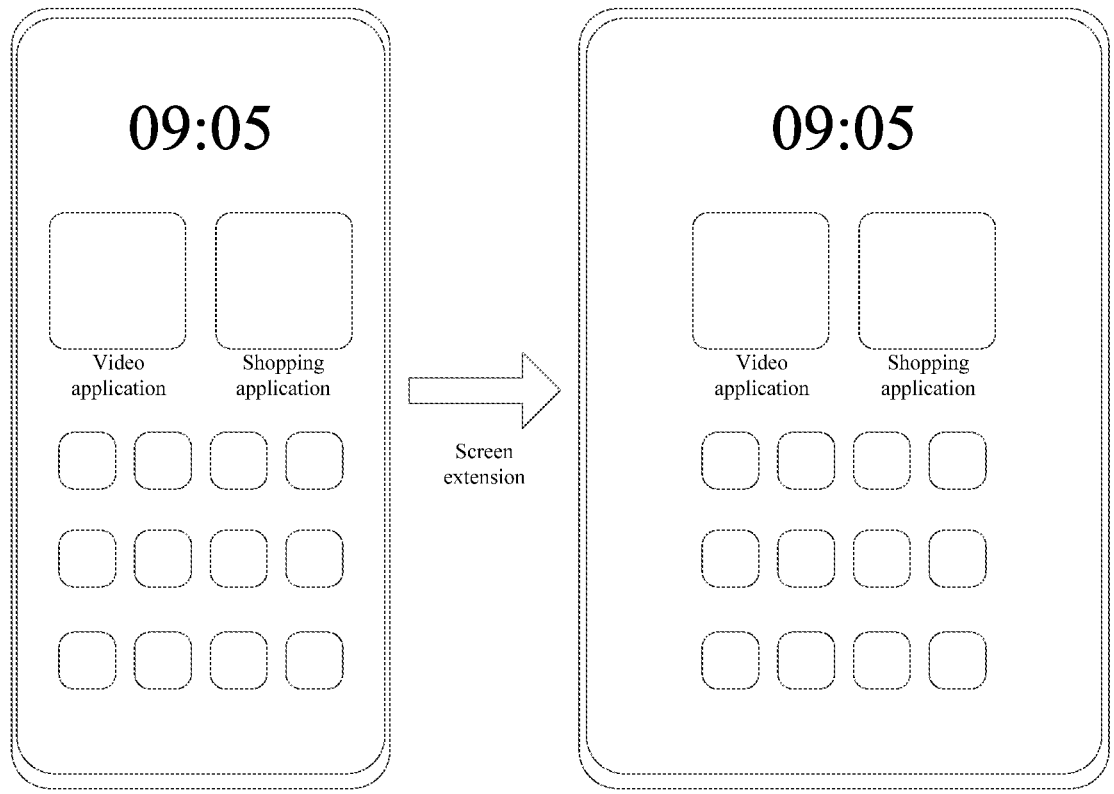
FIG. 1 is a schematic diagram of screen extension of a rollable-display electronic device according to an embodiment of this application.

As shown in FIG. 1, a rollable-display electronic device in an embodiment of this application is a rollable-display electronic device with an extensible screen. In a normal case, a part of a screen of the electronic device is contracted inside the electronic device. When required by a user, a mechanism inside the electronic device may be controlled to extend the screen, and a screen display area of an extended electronic device is larger. Content displayed on the screen may be adjusted adaptively during extension. In some solutions, the rollable-display electronic device may be divided into two parts. That is, the screen of the electronic device may be extended toward only one side. In some other solutions, the rollable-display electronic device may be divided into three parts. That is, the screen of the electronic device may be extended toward two sides separately based on a middle part. The rollable-display electronic device in this embodiment of this application may be any one of the foregoing two design solutions. Although extension manners are different, a final extension effect is the same. The final extension effect is extension of the display area of the screen.

A shooting method provided in an embodiment of this application may be applied to a shooting scenario in a low illumination environment.

For example, in the shooting scenario in the low illumination environment, in related technologies, light fill-in may be performed on a shot object by increasing a brightness of an entire screen of a single-screen electronic device. However, such light fill-in manner may lead to a difference between an effect of a finally obtained image and a shooting effect of preview by the user, resulting in a poor shooting effect. For a foldable screen, light fill-in may be performed on a shot object by adjusting a foldable angle of the foldable screen and the like. However, in such light fill-in manner, the user is to adjust the foldable angle of the foldable screen manually. In addition, because a screen size of the foldable screen in a folded state and a screen size of the foldable screen in an unfolded state differ greatly, the user is to change a gesture of the user when holding the electronic device. For example, holding with one hand is changed to holding with two hands, bringing inconvenience to the user.

To resolve this problem, in a technical solution provided in an embodiment of this application, for the rollable-display electronic device with an extensible screen, this embodiment of this application provides a shooting method different from the foregoing two light fill-in solutions. In a case that a luminous intensity of a current shooting environment is low, based on extension of a rollable display, an extension amplitude value of a screen may be determined based on a proportion of a shot object to in shooting interface, and a display region of the screen is extended based on the extension amplitude value. For example, when the shot object is close to the screen, the shot object has a large proportion in the shooting interface. In this case, too much light is not to be filled in for the shot object. Then the target brightness value of an extended screen is determined based on the brightness parameter of the current shooting environment, and the brightness of the screen is adjusted based on the target brightness value, to improve a shooting effect under a low illumination condition.

With reference to the accompanying drawings, the shooting method provided in this embodiment of this application is described in detail by using a specific embodiment and an application scenario of the embodiment.

Figure 2:
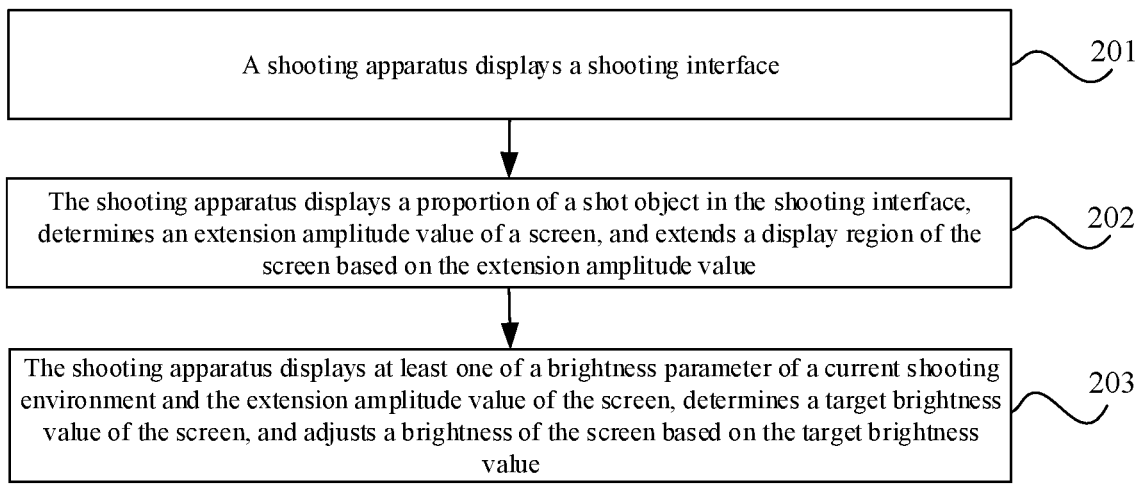
FIG. 2 is a schematic flowchart of a shooting method according to an embodiment of this application.

As shown in FIG. 2, an embodiment of this application provides a shooting method. The method may include the following step 201 to step 203.

Step 201: A shooting apparatus displays a shooting interface.

For example, when using the shooting apparatus for shooting, a user triggers, by using a camera application, the shooting apparatus to display the shooting interface. The user may preview a shooting effect in the shooting interface, and taps, after adjusting a shooting posture and a shooting angle, a shooting button in the shooting interface to complete shooting.

For example, the shooting interface may be a shooting interface of a camera application of an electronic device or a shooting interface of another third-party application as long as the shooting interface is used for shooting a subject. Such shooting interface shall fall within the protection scope of this embodiment.

Step 202: The shooting apparatus displays a proportion of the shot object in the shooting interface, determines an extension amplitude value of a screen, and extends a display region of the screen based on the extension amplitude value.

The screen is a rollable display with an extensible display region. The extension amplitude value of the screen is negatively correlated with the proportion of the shot object in the shooting interface. That is, the extension amplitude value of the screen decreases with an increase of the proportion of the shot object in the shooting interface.

For example, after the shooting apparatus displays the shooting interface, if an illumination condition of a current shooting environment does not meet a shooting requirement, that is, under the current lighting condition, an effect of a shot image is poor. In this case, a light fill-in function of the shooting apparatus is triggered, to fill in light for the current shooting environment or the shot object.

For example, the shooting apparatus may determine the proportion of the shot object in the shooting interface based on a proportion, in the shooting interface, of a corresponding pixel of the shot object in the shooting interface. Specifically, a profile of the shot object in the shooting interface may be recognized by image recognition, and further, the proportion of the shot object in the shooting interface is determined by calculating a proportion of the profile in the shooting interface.

For example, after determining the extension amplitude value of the screen, the shooting apparatus adjusts the screen based on the extension amplitude value. The shooting apparatus may adjust a size of a display area of the screen by using an adjustment mechanism disposed inside the shooting apparatus. The extension amplitude value is used to indicate an increased percentage of a display area of the extended screen.

For example, in a case that the shooting apparatus is a bidirectional or multi-directional extendable rollable-display electronic device, the shooting apparatus may further determine an extension direction and an extension amplitude value of the screen based on the proportion of the shot object in the shooting interface, and extend the screen based on the extension direction and the extension amplitude value. An effect of different screen extension solutions is to extend the display area of the screen. Therefore, this embodiment of this application limits only an extension amplitude of the screen, but does not limit a specific extension solution.

It may be understood that when the proportion of the shot image in the shooting interface is large, it indicates that a distance between the shot object and the screen is short, and a proportion of light emitted by the screen to the shot object is large. In this case, the shooting apparatus does not need to perform light fill-in on the shot object greatly, and a small screen extension amplitude may meet a light fill-in requirement.

Step 203: The shooting apparatus displays at least one of a brightness parameter of a current shooting environment and the extension amplitude value of the screen, determines a target brightness value of the screen, and adjusts a brightness of the screen based on the target brightness value.

For example, after extending the screen, the shooting apparatus determines a light fill-in degree of the screen based on the at least one of the brightness parameter of the current shooting environment and the extension amplitude value of the screen. To optimize light fill-in logic for the shooting apparatus, the light fill-in degree may be determined based on a current brightness parameter and/or a screen brightness value corresponding to a current extension amplitude value of the screen in a preset brightness value comparison table.

For example, the target brightness value is a brightness value finally adjusted for the screen. When light fill-in is to be performed on the screen of the shooting apparatus in the current shooting environment, the target brightness value is greater than a current brightness value of the screen. When a brightness of the current shooting environment is low, but a brightness of a surface of a shot object is excessively high, the target brightness value may also be lower than the current brightness value of the screen.

It may be understood that, in a case that other conditions are the same, a larger extension amplitude of the screen indicates a smaller brightness value that needs to be added to the screen. A lower brightness of the current shooting environment indicates a larger brightness value that needs to be added to the screen. The shooting apparatus may adjust a brightness value of the screen based on the foregoing principle. Based on the foregoing principle, the shooting apparatus may adjust the brightness of the screen based on at least one of the brightness parameter of the shooting environment and the extension amplitude value of the screen.

In this way, in a case that a luminous intensity of a current shooting environment is low, based on extension of a rollable display, the extension amplitude value of the screen may be determined based on the proportion of the shot object in the shooting interface, and the display region of the screen is extended based on the extension amplitude value. Then the target brightness value of an extended screen is determined based on the brightness parameter of the current shooting environment, and the brightness of the screen is adjusted based on the target brightness value, to improve a shooting effect under a low illumination condition.

Optionally, in this embodiment of this application, the brightness parameter of the current shooting environment may be adjusted more accurately so that light fill-in may be performed on a shooting activity of the user under a more specific determining condition.

For example, the brightness parameter may include a plurality of parameters that are used to affect a brightness of the current shooting environment. Specifically, the brightness parameter may include at least one of the following: an ambient light sensitivity and a brightness parameter of a surface of the shot object. The ambient light sensitivity is used to indicate a luminous intensity of a current shooting environment, and the brightness parameter of the surface of the shot object is used to indicate a luminous intensity of the surface of the shot object. The shooting apparatus may adjust the brightness of the screen based on the foregoing two luminous intensities, to improve an effect of a finally obtained image.

It may be understood that the ambient light sensitivity is used to indicate the luminous intensity of the current shooting environment, and the luminous intensity of the current shooting environment may affect the brightness of the surface of the shot object, or may be affected by light fill-in on the screen of the shot apparatus. The brightness parameter of the surface of the shot object is used to indicate the luminous intensity of the surface of the shot object. For example, in a case that the shot object is a person, the luminous intensity of the surface of the shot object may be a luminous intensity of a human face. The luminous intensity is related to the luminous intensity of the current shooting environment and a light fill-in intensity of the screen of the shooting apparatus.

For example, step 203 may include the following step 203a1 and step 203a2.

Step 203a1: The shooting apparatus determines the target brightness value of the screen based on at least one of the ambient light sensitivity, the brightness parameter of the surface of the shot object, and the extension amplitude value of the screen.

For example, the shooting apparatus may determine, based on at least one of the foregoing three determining conditions, a brightness value to be adjusted on the screen.

In a possible implementation, the target brightness value is negatively correlated with the extension amplitude value, the target brightness value is negatively correlated with the ambient light sensitivity, or the target brightness value is negatively correlated with a surface brightness parameter of the shot object. A specific adjustment method is described in detail in the foregoing process. To avoid repetition, details are not described herein again.

Step 203a2: The shooting apparatus gradually adjusts the brightness value of the screen to the target brightness value based on a current brightness value of the screen, and stops adjusting the brightness value of the screen if detecting that the shot object has a photophobia expression while adjusting the brightness value of the screen.

For example, after determining the target brightness value, the shooting apparatus starts to adjust the brightness of the screen. The adjustment manner includes: the shooting apparatus gradually increases or decreases a brightness parameter of the screen based on the current brightness value, detects a facial expression of the shot object in real time while adjusting the brightness value of the screen, and stops adjusting the brightness of the screen if the shot object has a photophobia expression. In addition, the brightness value of the screen may be appropriately reduced, to prevent strong light stimulation on the shot object. After the facial expression of the shot object is normal, that is, the shot object is adapted to the current brightness of the screen, the brightness of the screen is continuously adjusted.

In this way, the shooting apparatus may determine, based on a plurality of determining conditions, a brightness value to be adjusted on the screen. This enables light fill-in logic to be further optimized, and in consideration of a feeling of the shot object, prevents strong light stimulation on the shot object while adjusting the brightness value of the screen.

Optionally, in this embodiment of this application, after a display region of the screen is extended, to prevent an increase of a screen brightness value of a region in which the shooting interface is located, leading to a large difference between a shot and previewed image and a final image, the shooting apparatus does not need to adjust a brightness of an entire screen, but adjusts only a brightness of a part of a region of the screen.

For example, step 203 may include the following step 203a.

Step 203a: The shooting apparatus determines a target brightness value of a target region of the screen based on the brightness parameter.

The target region includes an extended display region of the screen based on the extension amplitude value. In addition, the target region does not include a region corresponding to the shot object in the foregoing shooting interface.

For example, after extending the display region of the screen, the shooting apparatus may adjust only a brightness of an increased region of the screen. In a case that previewing a shot and previewed image by the user is not affected, the target region may also include a partial region in which the shooting interface is located, but may not include a region corresponding to the shot object in the shooting interface.

For example, after the target brightness value of the target region is determined, step 203 may include the following step 203b.

Step 203b: The shooting apparatus adjusts a brightness of the target region based on the target brightness value.

In a possible implementation, the target region includes a first region and a second region. The first region and the second region are respectively corresponding to different regions of the surface of the shot object. The shooting apparatus may determine a first brightness value and a second brightness value based on brightness parameters of different regions of the surface of the shot object.

In this case, step 203b may include the following step 203b1.

Step 203b1: The shooting apparatus adjusts a brightness of the first region based on the first brightness value and adjusts a brightness of the second region based on the second brightness value.

Figure 3:
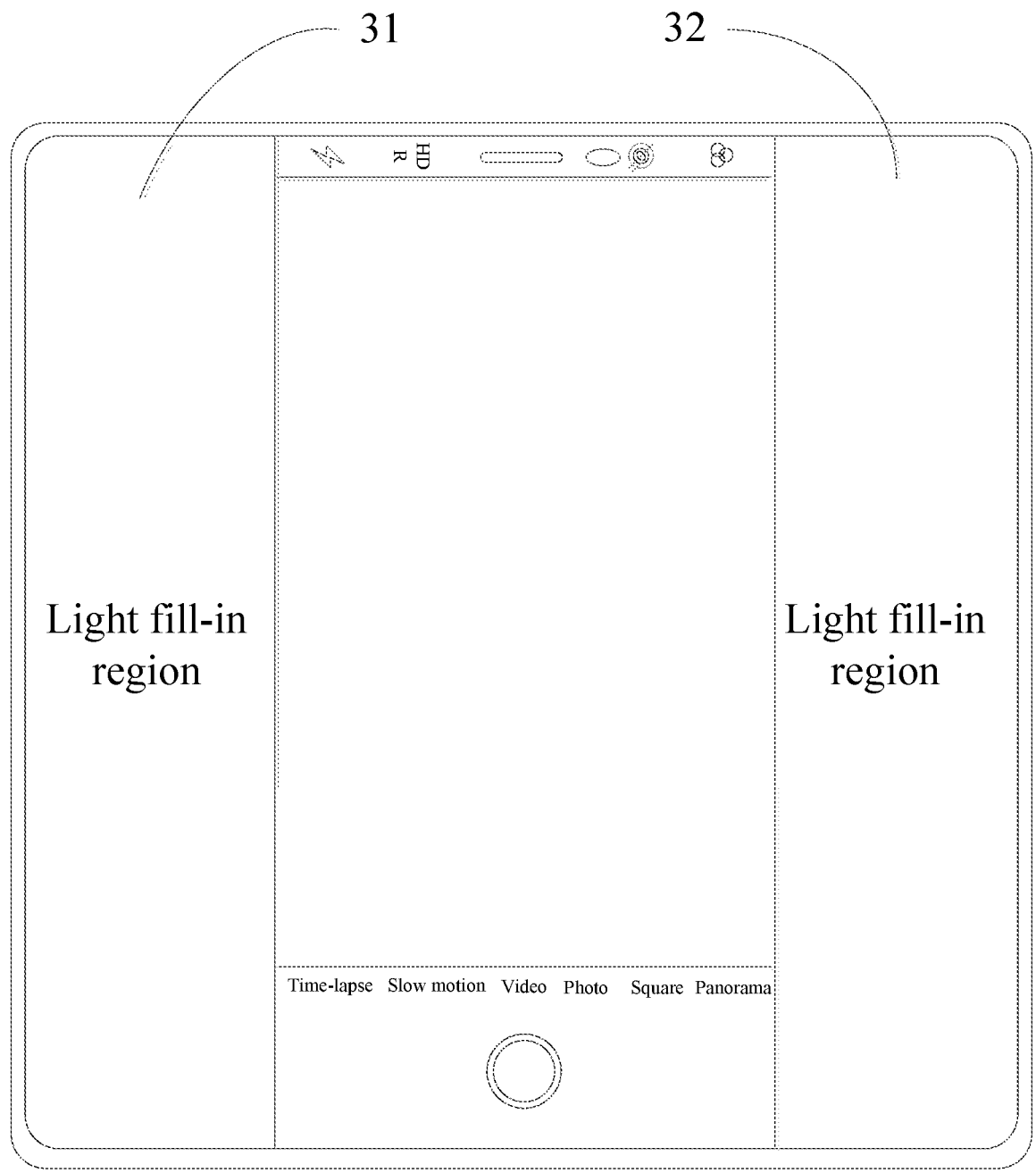
FIG. 3 is a diagram of a light fill-in effect obtained in a shooting method according to an embodiment of this application.

For example, as shown in FIG. 3, a region 31 and a region 32 are regions increased after the display region of the screen is extended, and a region between the region 31 and the region 32 is a region in which the shooting interface is located. The shooting apparatus may adjust screen brightness of the region 31 and the region 32, to perform light fill-in on a current shooting activity. In addition, the shooting apparatus may further separately adjust screen brightness of the region 31 and the region 32, to perform light fill-in on the current shooting activity.

In this way, after the screen is extended, the shooting apparatus adjusts a screen brightness of an extended region, without adjusting a brightness of a region in which the shooting interface is located. This prevents a great difference between a shot image previewed by the user and a final image due to an excessively high brightness.

Optionally, in this embodiment of this application, after the shooting apparatus performs light fill-in on the current shooting activity in the foregoing method, if a requirement of the current shooting activity for light still cannot be met, the shooting apparatus may perform further adjustment.

For example, after step 203, the shooting method provided in this embodiment of this application may further include the following step 204.

Step 204: In a case that the brightness value of the target region reaches a maximum brightness value, if the brightness value of the surface of the shot object does not meet a brightness required in a preset shooting condition, the shooting apparatus increases the extension amplitude value of the screen.

For example, when the shooting apparatus adjusts the screen brightness of the target region to a maximum value, but still cannot meet the requirement of the shooting activity for light, the shooting apparatus may further increase the extension amplitude value of the screen, to increase an area of a light emitting region of the screen, increasing filled-in light.

For example, the preset shooting condition may be customized by the user based on a requirement of the user or determined by the shooting apparatus. For example, the shooting apparatus may detect a surface brightness value of the shot object. When the screen brightness value of the target region reaches a maximum brightness value, and a surface brightness value of the shot object is still less than a preset brightness value, the shooting apparatus may consider that current filled-in light is not enough, and more light may be filled in by further increasing an extension area of the screen.

In this way, if the shooting requirement still cannot be met after the shooting apparatus performs light fill-in, the shooting apparatus may further increase light fill-in by increasing an extension area of the screen, to enable an image shot through the shooting apparatus to meet user requirements.

In the shooting method provided in this embodiment of this application, in a case that a luminous intensity of the current shooting environment is low, based on extension of a rollable display, the extension amplitude value of the screen may be determined based on a proportion of a shot object in a shooting interface, and a display region of the screen is extended based on the extension amplitude value. For example, when the shot object is close to the screen, the shot object has a large proportion in the shooting interface. In this case, too much light is not to be filled in for the shot object. Then the target brightness value of an extended screen is determined based on the brightness parameter of the current shooting environment, and the brightness of the screen is adjusted based on the target brightness value, to improve a shooting effect under a low illumination condition.

It should be noted that the shooting method provided in this embodiment of this application may be performed by the shooting apparatus or a control module, in the shooting apparatus, configured to perform the shooting method. In this embodiment of this application, the shooting apparatus provided in this embodiment of this application is described by taking that the shooting apparatus performs the shooting method as an example.

It should be noted that, in this embodiment of this application, the foregoing methods are shown in drawings. The shooting methods are described as an example with reference to one of accompanying drawings in this embodiment of this application. In specific implementation, the shooting method shown in each drawing of the method may also be implemented in combination with any other drawings shown in the foregoing embodiments. Details are not described herein again.

Figure 4:
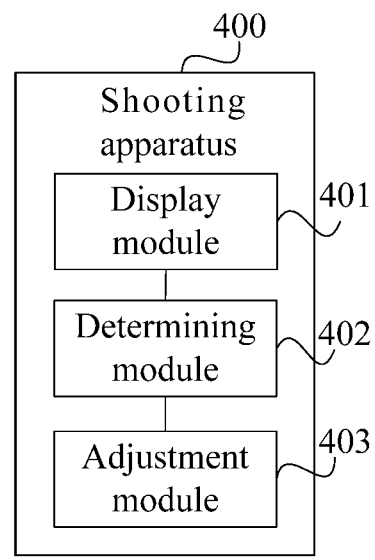
FIG. 4 is a schematic diagram of a structure of a shooting apparatus according to an embodiment of this application.

FIG. 4 is a possible schematic diagram of a structure of a shooting apparatus according to an embodiment of this application. As shown in FIG. 4, the shooting apparatus 400 includes: a display module 401, a determining module 402, and an adjustment module 403.

The display module 401 is configured to display a shooting interface. The determining module 402 is configured to determine an extension amplitude value of a screen based on a proportion of a shot object in the shooting interface displayed by the display module 401. The adjustment module 403 is configured to extend a display region of the screen based on the extension amplitude value determined by the determining module 402. The determining module 402 is further configured to determine a target brightness value of the screen based on at least one of a brightness parameter of a current shooting environment and the extension amplitude value of the screen. The adjustment module 403 is further configured to adjust a brightness of the screen based on the target brightness value determined by the determining module 402. The screen is a rollable display with an extensible display region. The extension amplitude value of the screen is negatively correlated with the proportion of the shot object in the shooting interface.

Optionally, the brightness parameter includes at least one of the following: an ambient light sensitivity and a brightness parameter of a surface of the shot object. The determining module 402 is specifically configured to determine the target brightness value of the screen based on at least one of the ambient light sensitivity, the brightness parameter of the surface of the shot object, and the extension amplitude value of the screen. The adjustment module 403 is specifically configured to: gradually adjust, based on the current brightness value of the screen, a brightness value of the screen to the target brightness value determined by the determining module 402, and stop adjusting the brightness value of the screen if detecting that the shot object has a photophobia expression while adjusting the brightness value of the screen.

Optionally, the determining module 402 is specifically configured to determine a target brightness value of a target region of the screen based on the brightness parameter. The target region includes an extended display region of the screen based on the extension amplitude value. The target region does not include a region corresponding to the shot object in the shooting interface. The adjustment module 403 is specifically configured to adjust a brightness of the target region based on the target brightness value determined by the determining module 402.

Optionally, the adjustment module 403 is further configured to increase the extension amplitude value of the screen in a case that the brightness value of the target region reaches a maximum brightness value and if a brightness value of a surface of the shot object does not meet a brightness required in a preset shooting condition.

Optionally, the target brightness value is negatively correlated with the extension amplitude value, the target brightness value is negatively correlated with the ambient light sensitivity, or the target brightness value is negatively correlated with a surface brightness parameter of the shot object.

The shooting apparatus in this embodiment of this application may be an apparatus, or a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (ultra-mobile personal computer, UMPC), a netbook, a personal digital assistant (personal digital assistant, PDA), or the like. The non-mobile electronic device may be a server, a network attached storage (Network Attached Storage, NAS), a personal computer (personal computer, PC), a television (television, TV), a teller machine, a self-service machine, or the like. This is not specifically limited in this embodiment of this application.

The shooting apparatus in this embodiment of this application may be an apparatus with an operating system. The operating system may be an Android (Android) operating system, an iOS operating system, or another possible operating system, which is not specifically limited in embodiments of this application.

The shooting apparatus provided in this embodiment of this application can implement processes implemented by the shooting apparatus in the method embodiments of FIG. 1 to FIG. 3. To avoid repetition, details are not described herein again.

For a beneficial effect of each implementation in this embodiment, refer to a beneficial effect of a corresponding implementation in the foregoing method embodiment. To avoid repetition, details are not described herein again.

In the shooting apparatus provided in this embodiment of this application, in a case that a luminous intensity of the current shooting environment is low, based on extension of a rollable display, the extension amplitude value of the screen may be determined based on the proportion of a shot object in the shooting interface, and a display region of the screen is extended based on the extension amplitude value. For example, when the shot object is close to the screen, the shot object has a large proportion in the shooting interface. In this case, too much light is not to be filled in for the shot object. Then the target brightness value of an extended screen is determined based on the brightness parameter of the current shooting environment, and the brightness value of the screen is adjusted based on the target brightness value, to improve a shooting effect under a low illumination condition.

Figure 5:
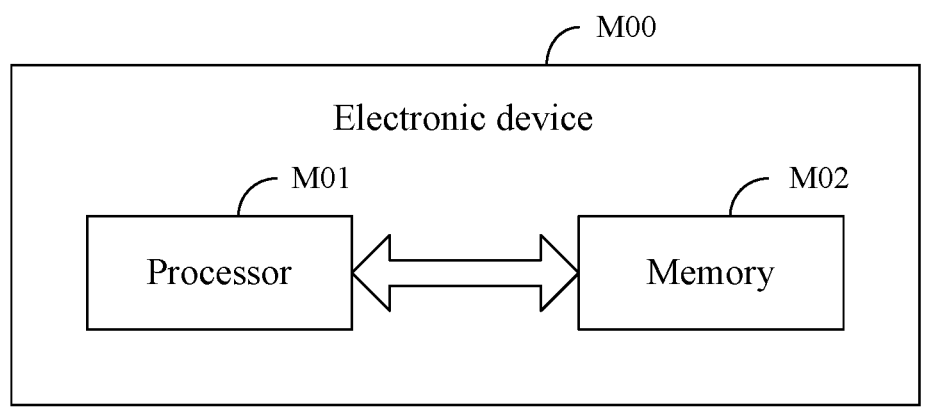
FIG. 5 is a first schematic diagram of a structure of an electronic device according to an embodiment of this application.

Optionally, as shown in FIG. 5, an embodiment of this application further provides an electronic device M00, including a processor M01, a memory M02, a program or instructions stored in the memory M02 and runnable on the processor M01. When the program or the instructions are executed by the processor M01, processes of the foregoing shooting method embodiment may be implemented, and a same technical effect can be achieved. To avoid repetition, details are not described herein again.

It should be noted that the electronic device in this embodiment of this application includes the foregoing mobile electronic device and the foregoing non-mobile electronic device.

Figure 6:
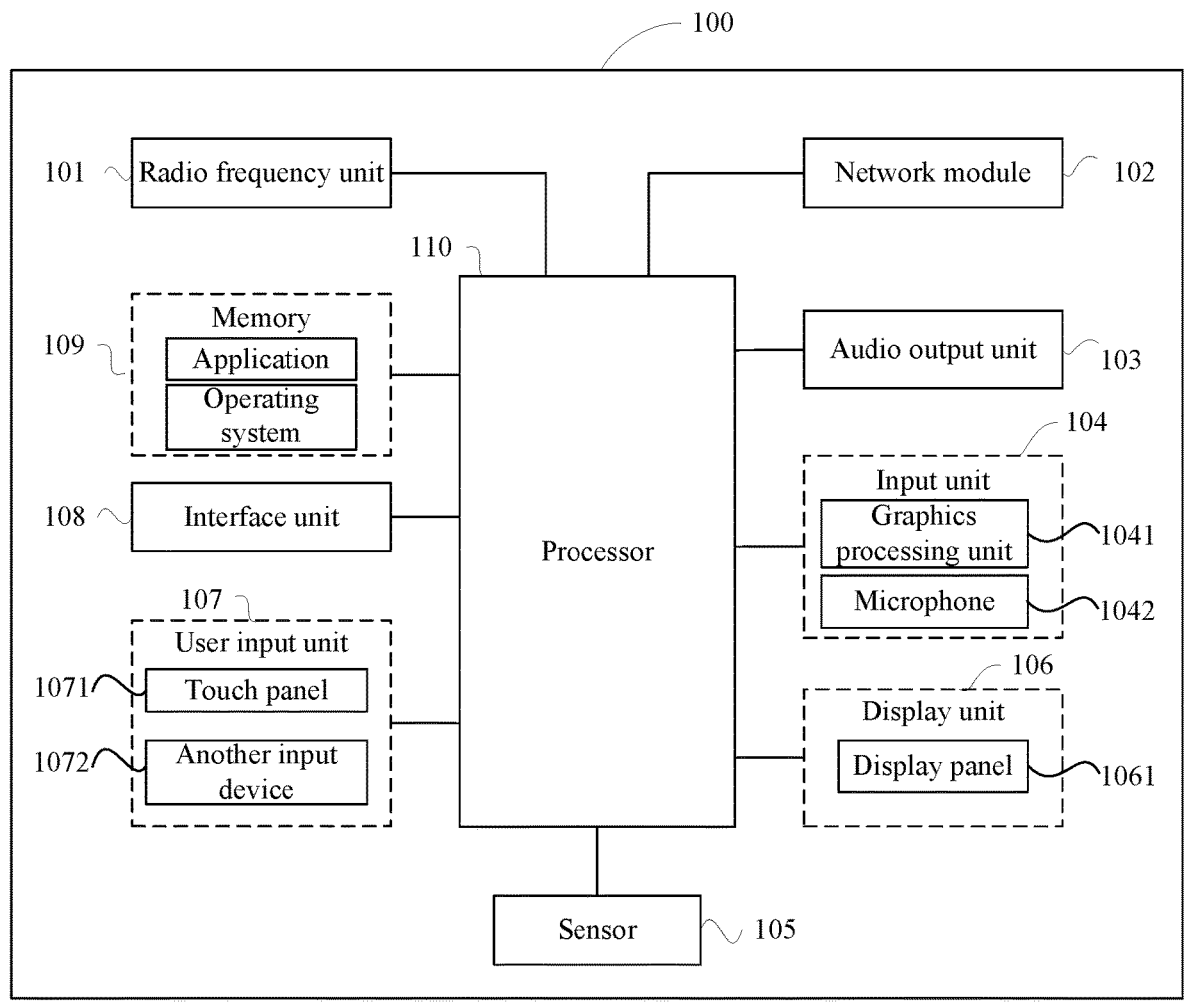
FIG. 6 is a second schematic diagram of a structure of an electronic device according to an embodiment of this application.

FIG. 6 is a schematic diagram of a hardware structure of an electronic device for implementing embodiments of this application.

The electronic device 100 includes but is not limited to: components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the electronic device 100 may further include a power supply (such as a battery) that supplies power to each component.

The power supply may be logically connected to the processor 110 by using a power supply management system, to implement functions such as charging and discharging management, and power consumption management by using the power supply management system. The structure of the electronic device shown in FIG. 6 does not constitute a limitation on the electronic device. The electronic device may include more or fewer components than those shown in the diagram, a combination of some components, or different component arrangements. Details are not described herein.

The display unit 106 is configured to display a shooting interface. The processor 110 is configured to determine an extension amplitude value of a screen based on a proportion of a shot object in the shooting interface displayed by the display unit 106. The processor 110 is configured to extend a display region of the screen based on the extension amplitude value determined by the processor 110. The processor 110 is further configured to determine a target brightness value of the screen based on at least one of a brightness parameter of a current shooting environment and the extension amplitude value of the screen. The processor 110 is further configured to adjust a brightness of the screen based on the target brightness value determined by the processor 110. The screen is a rollable display with an extensible display region. The extension amplitude value of the screen is negatively correlated with the proportion of the shot object in the shooting interface.

In this way, in a case that a luminous intensity of a current shooting environment is low, based on extension of a rollable display, the extension amplitude value of the screen may be determined based on the proportion of the shot object in the shooting interface, and the screen is extended based on the extension amplitude value. Then the target brightness value of an extended screen is determined based on the brightness parameter of the current shooting environment, and the brightness value of the screen is adjusted based on the target brightness value, to improve a shooting effect under a low illumination condition.

Optionally, the brightness parameter includes at least one of the following: an ambient light sensitivity and a brightness parameter of a surface of the shot object. The processor 110 is specifically configured to determine the target brightness value of the screen based on at least one of the ambient light sensitivity, the brightness parameter of the surface of the shot object, and the extension amplitude value of the screen. The processor 110 is specifically configured to: gradually adjust, based on a current brightness value of the screen, a brightness value of the screen to the target brightness value determined by the processor 110, and stop adjusting the brightness value of the screen if detecting that the shot object has a photophobia expression while adjusting the brightness value of the screen.

In this way, the shooting apparatus may determine, based on a plurality of determining conditions, a brightness value to be adjusted on the screen. This enables light fill-in logic to be further optimized, and in consideration of a feeling of a shot object, prevents strong light stimulation while adjusting the brightness of the screen.

Optionally, the processor 110 is specifically configured to determine a target brightness value of a target region of the screen based on the brightness parameter. The target region includes an extended display region of the screen based on the extension amplitude value. The target region does not include a region corresponding to the shot object in the shooting interface. The processor 110 is specifically configured to adjust a brightness of the target region based on the target brightness value determined by the processor 110.

In this way, after the screen is extended, the shooting apparatus adjusts a screen brightness of an extended region, without adjusting a brightness of a region in which the shooting interface is located. This prevents a great difference between a shot image previewed by the user and a final image due to an excessively high brightness.

Optionally, the processor 110 is further configured to increase the extension amplitude value of the screen in a case that a brightness value of the target region reaches a maximum brightness value and if a brightness value of the surface of the shot object does not meet a brightness required in a preset shooting condition.

In this way, if the shooting requirement still cannot be met after the shooting apparatus performs light fill-in, the shooting apparatus may further increase light fill-in by increasing an extension area of the screen, to enable an image shot through the shooting apparatus to meet user requirements.

In the electronic device provided in this embodiment of this application, in a case that a luminous intensity of the current shooting environment is low, based on extension of a rollable display, the extension amplitude value of the screen may be determined based on the proportion of the shot object in the shooting interface, and the display region of the screen is extended based on the extension amplitude value. For example, when the shot object is close to the screen, the shot object has a large proportion in the shooting interface. In this case, too much light is not to be filled in for the shot object. Then the target brightness value of an extended screen is determined based on the brightness parameter of the current shooting environment, and the brightness value of the screen is adjusted based on the target brightness value, to improve a shooting effect under a low illumination condition.

It should be understood that, in this embodiment of this application, the input unit 104 may include a graphics processing unit (Graphics Processing Unit, GPU) 1041 and a microphone 1042. The graphics processing unit 1041 processes image data of a static picture or a video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various pieces of data, including but not limited to an application and an operating system. An application processor and a modem processor may be integrated into the processor 110. The application processor mainly processes an operating system, a user interface, an application, and the like. The modem processor mainly processes wireless communication. It may be understood that, alternatively, the modem processor may not be integrated into the processor 110.

An embodiment of this application further provides a readable storage medium. The readable storage medium stores a program or instructions. When the program or the instructions are executed by a processor, processes of the shooting method embodiment are implemented, and a same technical effect can be achieved. To avoid repetition, details are not described herein again.

The processor is a processor in the electronic device in the foregoing embodiment. The readable storage medium includes a computer-readable storage medium such as a computer read-only memory (Read-Only Memory, ROM), a random access memory (Random Access Memory, RAM), a magnetic disk, an optical disc, or the like.

An embodiment of this application further provides a chip. The chip includes a processor and a communication interface. The communication interface is coupled to the processor. The processor is configured to run a program or instructions to implement processes of the foregoing shooting method embodiment, and a same technical effect can be achieved. To avoid repetition, details are not described herein again.

It should be understood that the chip in the embodiments of this application may also be referred to as a system-level chip, a system chip, a chip system, a system on chip, or the like.

It should be noted that, in this specification, the terms "include", "comprise", or any other variant thereof are intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. Furthermore, it should be noted that the scope of the methods and apparatuses in the implementations of this application is not limited to performing functions in an order shown or discussed, but may also include performing the functions in a substantially simultaneous manner or in a reverse order depending on the functions. For example, the described methods may be performed in an order different from that described, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing an electronic device (which may be mobile phone, a computer, a server, a network device, or the like) to perform the methods described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make a plurality of forms without departing from the objective and the scope of the claims of this application, and these forms all fall within the protection scope of this application.

The invention claimed is:

1. A shooting method, comprising:
  displaying a shooting interface;
  determining an extension amplitude value of a screen based on a proportion of a shot object in the shooting interface, and extending a display region of the screen based on the extension amplitude value; and
  determining a target brightness value of the screen based on at least one of a brightness parameter of a current shooting environment and the extension amplitude value of the screen, and adjusting a brightness of the screen based on the target brightness value,
  wherein the screen is a rollable display with an extensible display region; and the extension amplitude value of the screen is negatively correlated with the proportion of the shot object in the shooting interface.

2. The method according to claim 1, wherein the brightness parameter comprises at least one of the following: an ambient light sensitivity and a brightness parameter of a surface of the shot object, and
  the determining a target brightness value of the screen based on at least one of a brightness parameter of a current shooting environment and the extension amplitude value of the screen, and adjusting a brightness of the screen based on the target brightness value comprises:
  determining the target brightness value of the screen based on at least one of the ambient light sensitivity, the brightness parameter of the surface of the shot object, and the extension amplitude value of the screen; and
  gradually adjusting a brightness value of the screen to the target brightness value based on a current brightness value of the screen, and stopping adjusting the brightness value of the screen if detecting that the shot object has a photophobia expression while adjusting the brightness value of the screen.

3. The method according to claim 2, wherein determining the target brightness value of the screen based on the brightness parameter of the current shooting environment comprises:
  determining a target brightness value of a target region of the screen based on the brightness parameter,
  wherein the target region comprises an extended display region of the screen based on the extension amplitude value; and the target region does not comprise a region corresponding to the shot object in the shooting interface; and
  the adjusting a brightness of the screen based on the target brightness value comprises:
  adjusting a brightness of the target region based on the target brightness value.

4. The method according to claim 2, wherein after the adjusting a brightness of the screen based on the target brightness value, the method further comprises:
  increasing the extension amplitude value of the screen in a case that a brightness value of the target region reaches a maximum brightness value and if a brightness value of the surface of the shot object does not meet a brightness required in a preset shooting condition.

5. The method according to claim 2, wherein the target brightness value is negatively correlated with the extension amplitude value, the target brightness value is negatively correlated with the ambient light sensitivity, or the target brightness value is negatively correlated with a surface brightness parameter of the shot object.

6. An electronic device, comprising: a processor, a memory, and a program or instructions stored in the memory and runnable on the processor, wherein when the program or the instructions are executed by the processor, the following steps are preformed:

displaying a shooting interface;

determining an extension amplitude value of a screen based on a proportion of a shot object in the shooting interface, and extending a display region of the screen based on the extension amplitude value; and determining a target brightness value of the screen based on at least one of a brightness parameter of a current shooting environment and the extension amplitude value of the screen, and adjusting a brightness of the screen based on the target brightness value, wherein the screen is a rollable display with an extensible display region; and the extension amplitude value of the screen is negatively correlated with the proportion of the shot object in the shooting interface.

7. The electronic device according to claim 6, wherein the brightness parameter comprises at least one of the following: an ambient light sensitivity and a brightness parameter of a surface of the shot object, and the determining a target brightness value of the screen based on at least one of a brightness parameter of a current shooting environment and the extension amplitude value of the screen, and adjusting a brightness of the screen based on the target brightness value comprises:

determining the target brightness value of the screen based on at least one of the ambient light sensitivity, the brightness parameter of the surface of the shot object, and the extension amplitude value of the screen; and gradually adjusting a brightness value of the screen to the target brightness value based on a current brightness value of the screen, and stopping adjusting the brightness value of the screen if detecting that the shot object has a photophobia expression while adjusting the brightness value of the screen.

8. The electronic device according to claim 7, wherein determining the target brightness value of the screen based on the brightness parameter of the current shooting environment comprises:

determining a target brightness value of a target region of the screen based on the brightness parameter, wherein the target region comprises an extended display region of the screen based on the extension amplitude value; and the target region does not comprise a region corresponding to the shot object in the shooting interface; and the adjusting a brightness of the screen based on the target brightness value comprises:

adjusting a brightness of the target region based on the target brightness value.

9. The electronic device according to claim 7, wherein after the adjusting a brightness of the screen based on the target brightness value, the following steps are preformed:

increasing the extension amplitude value of the screen in a case that a brightness value of the target region reaches a maximum brightness value and if a brightness value of the surface of the shot object does not meet a brightness required in a preset shooting condition.

10. The electronic device according to claim 7, wherein the target brightness value is negatively correlated with the extension amplitude value, the target brightness value is negatively correlated with the ambient light sensitivity, or the target brightness value is negatively correlated with a surface brightness parameter of the shot object.

11. A non-transitory readable storage medium, wherein the readable storage medium stores a program or instructions, and when the program or the instructions are executed by a processor, the following steps are preformed:

displaying a shooting interface;

determining an extension amplitude value of a screen based on a proportion of a shot object in the shooting interface, and extending a display region of the screen based on the extension amplitude value; and determining a target brightness value of the screen based on at least one of a brightness parameter of a current shooting environment and the extension amplitude value of the screen, and adjusting a brightness of the screen based on the target brightness value, wherein the screen is a rollable display with an extensible display region; and the extension amplitude value of the screen is negatively correlated with the proportion of the shot object in the shooting interface.

12. The non-transitory readable storage medium according to claim 11, wherein the brightness parameter comprises at least one of the following: an ambient light sensitivity and a brightness parameter of a surface of the shot object, and the determining a target brightness value of the screen based on at least one of a brightness parameter of a current shooting environment and the extension amplitude value of the screen, and adjusting a brightness of the screen based on the target brightness value comprises:

determining the target brightness value of the screen based on at least one of the ambient light sensitivity, the brightness parameter of the surface of the shot object, and the extension amplitude value of the screen; and gradually adjusting a brightness value of the screen to the target brightness value based on a current brightness value of the screen, and stopping adjusting the brightness value of the screen if detecting that the shot object has a photophobia expression while adjusting the brightness value of the screen.

13. The non-transitory readable storage medium according to claim 12, wherein determining the target brightness value of the screen based on the brightness parameter of the current shooting environment comprises:

determining a target brightness value of a target region of the screen based on the brightness parameter, wherein the target region comprises an extended display region of the screen based on the extension amplitude value; and the target region does not comprise a region corresponding to the shot object in the shooting interface; and the adjusting a brightness of the screen based on the target brightness value comprises:

adjusting a brightness of the target region based on the target brightness value.

14. The non-transitory readable storage medium according to claim 12, wherein after the adjusting a brightness of the screen based on the target brightness value, the following steps are preformed:

increasing the extension amplitude value of the screen in a case that a brightness value of the target region reaches a maximum brightness value and if a brightness value of the surface of the shot object does not meet a brightness required in a preset shooting condition.

15. The non-transitory readable storage medium according to claim 12, wherein the target brightness value is negatively correlated with the extension amplitude value, the target brightness value is negatively correlated with the ambient light sensitivity, or the target brightness value is negatively correlated with a surface brightness parameter of the shot object.

* * * * *